Sept. 10, 1935.  G. A. P. CAREW  2,013,948
BRAKE
Filed Dec. 27, 1932
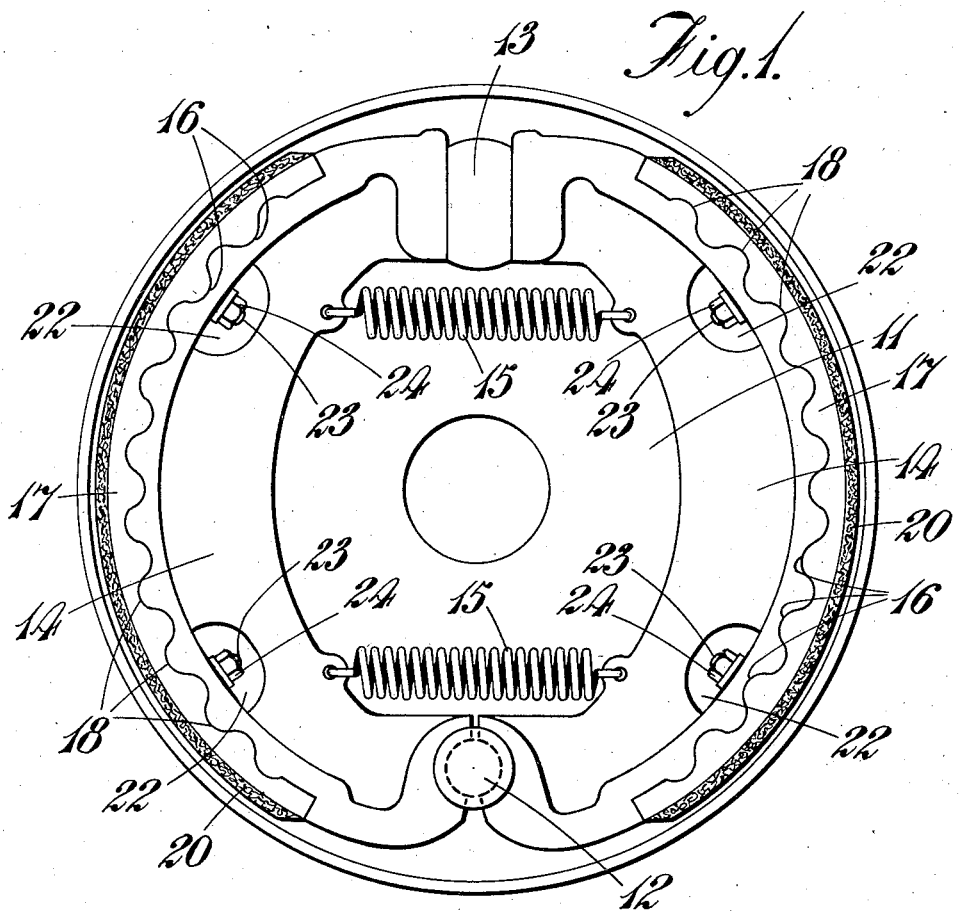
Fig.1.
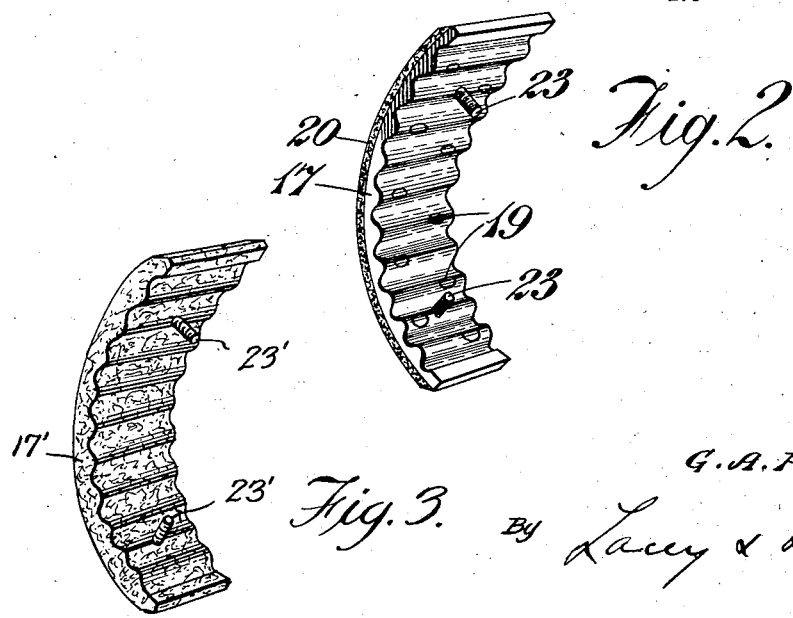
Fig.2.
Fig.3.
INVENTOR
G. A. Pole Carew.
By Lacey & Lacey
Attys Patented Sept. 10, 1935

2,013,948

UNITED STATES PATENT OFFICE 2,013,948

BRAKE

Gerald Ayshford Pole Carew, East Croydon, England, assignor of one-half to Charles William de Roemer, London, England Application December 27, 1932, Serial No. 649,098
In Great Britain February 26, 1932

1 Claim. (Cl. 188—234)

This invention relates to brakes, and in particular to those of the internally expanding or externally contracting type as commonly used on motor road vehicles. In connection with the latter it is the common practice at present to secure a brake lining of friction material to a brake element, such as a brake shoe or brake band, directly by means of rivets, and in view of the nature of the friction material employed and of the fact that it is secured directly to a brake element, the task of relining the brakes of a vehicle is a difficult and lengthy one, requiring the complete disassembling of the brake elements and a considerable amount of skill in properly securing the brake linings to said elements. It is, for example, necessary where all the brakes of a motor car have to be relined, to have the vehicle out of use for a considerable period, especially if the relining is to be carried out by an unskilled person. Moreover, unless the lining is properly secured to the brake elements, there is considerable risk of it becoming detached therefrom during the subsequent use of the brakes.

The object of the present invention is to provide an improved arrangement of brake elements which shall enable the task of brake relining very considerably to be reduced, and to render it possible for this work to be done even by an unskilled person in but little longer time than is required for the removal of the usual brake drums from position and their subsequent replacement after the linings have been renewed.

To this end and in accordance with the invention, each element of a brake is formed in two parts, namely, a main part similar to the brake elements as normally employed, and a subsidiary part shaped at one side to conform with the contour of the usual brake drum and at the other side to engage with the main part in such a manner as to be non-displaceable with regard thereto, circumferentially of the brake drum during use of the brake.

As desired, the subsidiary brake element parts may carry, or themselves constitute, the friction material lining of the brake.

The main brake element part may, according to convenience or requirements, be formed specially to replace the brake element which would normally be employed in the brake, or, alternatively, may be formed by modifying an already existing brake element for the non-displaceable engagement of a subsidiary brake element part, according to the invention, therewith.

In all cases the subsidiary brake element part will be of substantially the same transverse dimensions as a brake element of normal type, and in general it will be of a thickness but slightly greater than that of the usual brake lining, and it may be formed in any known or convenient way so as to be engaged non-rotatably with the main brake element part. The main brake element part and that side of the subsidiary brake element part which engages therewith will be formed with complementary irregularities so that when the latter is in position upon the former, the circumferential displacement of the one with regard to the other will be rendered impossible; the pressure exerted by the brake element as a whole through the medium of the subsidiary brake element part upon the brake drum merely causing said subsidiary and main parts to engage more effectively one with the other.

In addition to such complementary irregularities, however, the brake element parts will be secured together by one or more bolts and nuts or equivalent, which will serve to retain the subsidiary part in position upon the main part before the brake drum is placed in position.

In cases where the subsidiary brake element part carries the brake lining, the latter will be of normal type and the subsidiary part will be in the form of a thin slipper formed from metal and curved appropriately at its outer surface in order that the usual type of brake lining may readily be secured thereto, the inner surface of the slipper being formed so that it may engage non-displaceably with the main brake element part.

The invention is illustrated by the accompanying drawing, of which:

Figure 1 is a face view of a brake with a drum removed,

Figure 2 is a detail perspective view of the subsidiary part.

Figure 3 is a view similar to Figure 2 showing a modified construction.

The brake illustrated is of the usual internally-expanding type, having two oppositely disposed brake shoes pivotally mounted at one end, the other ends of which are adapted to be forced apart against spring-influence, by means of a cam in the well-known manner, and the usual brake shoe carrying plate is shown at 11 in Figure 1, the common brake shoe pivot at 12, the operating cam at 13. The main part 14 of each brake shoe is substantially T shape in cross section, the two parts being linked by springs 15, and the outer surface of the T is of considerably smaller diameter than the internal diameter of the brake drum (not shown) where it is formed throughout the greater part of its length with a continuous series of transverse corrugations as indicated at 16. Adjacent the ends of the outer surface of each T-shaped part are transverse shoulders which extend radially outward beyond a circumferential line touching the crest of the corrugations, and it will be noted that the sides of each corrugation diverge from the crest thereof to the adjacent troughs. Each subsidiary brake shoe part 17, see Figure 2, is formed from metal with transverse corrugations 18 at its inner surface which are complementary to the corrugations 16 of the main brake shoe part 14. The thickness of each subsidiary part 17 is such that its curved outer surface will, when the part is in position, be located within the brake drum in substantially the same position as would the curved outer surface of a brake shoe of normal type. It will be noted that the ends of each subsidiary member 17 are planes corresponding to the shoulders on the main member 14 so that the subsidiary member ends may abut the shoulders firmly and positively, the shoulders, consequently, cooperating with the corrugations in resisting circumferential shifting of the subsidiary member. The form of the corrugations facilitates assembling of the parts as the subsidiary member may be moved to and from the main member radially thereby avoiding contact of opposing edges of the parts which will cause excessive wear. Moreover, while the subsidiary member is readily removable it seats within the main member so that a brake embodying my invention need not be of any greater outside dimensions than a brake of ordinary construction for the same purpose. To each subsidiary brake element part 17 is secured by means of rivets, indicated at 19, the usual brake lining 20 of friction material, and at two points in the length of each main brake element part 14 there are formed openings 22 from which slots (not shown) extend to the outer surface of the part, so that a bolt or stud, indicated at 23, may project therethrough into the opening to have threaded thereover a nut 24 whereby the subsidiary part 17, with its brake lining 20 may be secured in position. By virtue, however, of the complementarily engaging corrugations of the main and subsidiary parts of each element, these bolts will receive none of the braking strain, all of which is taken through said corrugations.

In a modification shown in Figure 3, a subsidiary brake element part 17' is formed entirely from friction material of known or convenient type, thus enabling the use of rivets for securing the lining of a brake to the supporting element to be dispensed with entirely, it being understood that in this form of the invention, the subsidiary part will be secured to the main brake element part by bolts 23' the same as previously described.

Although the improvement according to the present invention is applicable particularly to the brakes of motor road vehicles, more especially those of privately owned motor cars, it is to be understood that the invention is applicable also to many other types of brakes, irrespective of whether or not they are used on a vehicle, for the advantages of the invention will still be great, even when applied, for example, to the brakes of winding gear and other machinery.

It will be observed that by an arrangement according to the present invention, the brakes of a vehicle may be relined with the minimum loss of time and with the minimum requirement of skill in carrying out the operation, it being simply necessary to remove the brake drums; to remove from the main brake element parts, without removing these from position, the subsidiary parts carrying worn-out linings; to replace these by another set of subsidiary parts carrying new linings, and then to replace the brake drums. The whole operation will take but little longer than the time taken by the removal and replacement of the brake drums themselves. It is intended that sets of subsidiary brake element parts should be made available for those who may wish to have the brakes of a vehicle owned by them renewed, and this will enable the renewal of the linings to be effected without having recourse to the services of skilled persons, and, moreover, without the necessity of a vehicle the brakes of which are to be renewed being placed out of service for more than a very short length of time.

What I claim is:—

For use in a brake of the type having a drum and fibrous material friction members, a brake element comprising a main arcuate part having on that side thereof presented to the brake drum two radial shoulders, one at each end thereof, and having between said shoulders on the same side a series of transverse corrugations, the sides of which diverge to the adjacent troughs, a subsidiary arcuate part abutting the shoulders and filling the space between said shoulders on the main arcuate part and having on that side thereof which is to be presented to the brake drum a fibrous friction surface and on the other side thereof a series of transverse corrugations complementary to the corrugations on the main arcuate part and interengaging therewith, the radial thickness of the subsidiary part at the crest of the corrugations being greater than the radial length of the shoulders on the main part, and means for securing the subsidiary part to the main part.

GERALD AYSHFORD POLE CAREW.